(12) United States Patent
Matsuda et al.

(10) Patent No.: US 10,409,538 B2
(45) Date of Patent: Sep. 10, 2019

(54) WEB SYSTEM, WEB SERVER, METHOD FOR DELIVERING DATA, AND COMPUTER-READABLE STORAGE MEDIUM FOR COMPUTER PROGRAM

(71) Applicant: KONICA MINOLTA, INC., Chiyoda-ku, Tokyo (JP)

(72) Inventors: Hideyuki Matsuda, Hirakata (JP); Yusaku Tanaka, Toyokawa (JP); Shinichi Asai, Gamagori (JP); Chohiko Fukuoh, Musashimurayama (JP); Hiroyuki Ohno, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 465 days.

(21) Appl. No.: 14/675,010

(22) Filed: Mar. 31, 2015

(65) Prior Publication Data

US 2015/0277835 A1      Oct. 1, 2015

(30) Foreign Application Priority Data

Mar. 31, 2014   (JP) .................................. 2014-071456

(51) Int. Cl.
 *G06F 3/12*   (2006.01)
 *H04L 29/08*   (2006.01)
 (Continued)

(52) U.S. Cl.
 CPC .......... *G06F 3/1294* (2013.01); *G06F 3/1207* (2013.01); *G06F 3/1224* (2013.01);
 (Continued)

(58) Field of Classification Search
 CPC ...................................................... G06F 3/1294
 See application file for complete search history.

(56) References Cited

U.S. PATENT DOCUMENTS

2010/0077024 A1*  3/2010  Yun ......................... G06F 15/16
                                                                       709/203
2011/0181902 A1*  7/2011  Chiba ................ H04N 1/00204
                                                                         358/1.13
(Continued)

FOREIGN PATENT DOCUMENTS

JP        2012-079213 A       4/2012

*Primary Examiner* — Nicholas P Celani
(74) *Attorney, Agent, or Firm* — Buchanan Ingersoll & Rooney PC

(57) ABSTRACT

A web system includes a web client having a web browser, and a web server for providing the web client with a computer program to be executed on the web browser. The web server includes a delivery portion configured to deliver, as the computer program, a predetermined processing program to the web client, the predetermined processing program causing the web client, when the web client starts receiving specific data from the web server, to execute inquiry processing of inquiring of the web server as to a state of transmission of the specific data in the web server, and the predetermined processing program causing the web client to execute predetermined processing after a reply that the transmission is completed is received as the state, and a reply portion configured to, when an inquiry as to the state is sent from the web client, inform the web client of the state.

17 Claims, 12 Drawing Sheets

(51) Int. Cl.
  *H04L 29/06* (2006.01)
  *H04N 1/00* (2006.01)
  *H04N 1/32* (2006.01)
(52) U.S. Cl.
  CPC ............ *G06F 3/1288* (2013.01); *H04L 67/02* (2013.01); *H04L 67/1095* (2013.01); *H04L 67/42* (2013.01); *H04N 1/00217* (2013.01); *H04N 1/00244* (2013.01); *H04N 1/00323* (2013.01); *H04N 1/32566* (2013.01); *H04L 63/083* (2013.01)

(56) References Cited

U.S. PATENT DOCUMENTS

| | | | | |
|---|---|---|---|---|
| 2012/0081749 | A1* | 4/2012 | Kitada | G06F 3/121 358/1.15 |
| 2012/0110613 | A1* | 5/2012 | Nakano | H04L 9/0844 725/31 |
| 2014/0185092 | A1* | 7/2014 | Takasu | G06F 3/1209 358/1.15 |

* cited by examiner

FIG. 5

```
        MFP_ABC TOP PAGE

LANGUAGE  [Japanese      ⌄]
LOGIN     ○ PUBLIC USER
          ⦿ ADMINISTRATOR
WORK      ○ NETWORK           ○ BOX
            MANAGEMENT          MANAGEMENT
          ○ STATUS CHECK      ○ PC-FAX
          ⦿ ADDITIONAL IMAGE
            MANAGEMENT                      ~50

[ LOG IN ]
```

53

WEB SYSTEM, WEB SERVER, METHOD FOR DELIVERING DATA, AND COMPUTER-READABLE STORAGE MEDIUM FOR COMPUTER PROGRAM

This application is based on Japanese patent application No. 2014-071456 filed on Mar. 31, 2014, the contents of which are hereby incorporated by reference.

BACKGROUND OF THE INVENTION

1. Field of the Invention

The present invention relates to a technology for delivering data through the web.

2. Description of the Related Art

A web browser displays a web page based on hypertext delivered by a web server. The hypertext is described in a markup language such as a Hypertext Markup Language (HTML) or an Extensible Markup Language (XML).

The use of the markup language enables a moving image having a format such as an animation Graphics Interchange Format (GIF) or a Moving Picture Experts Group (MPEG) to be provided in a web page.

The moving image having such a format cannot be varied in accordance with operation by a user. In short, the moving image having such a format is not dynamic very much.

To address this, a technology named "Flash" has been proposed and used widely. In the technology, a plug-in named "Flash Player" is installed on a web browser. The web browser downloads a script file called "Flash file" from a web site to execute the Flash file on the plug-in. This implements an animation and a video game which vary according to operation by a user.

A web technology is used in a printer. For example, a web browser is mounted in a printer. The printer sends, to a server, an HTTP request having status information of the printer embedded in a URL. The printer obtains HTML data from the server, and performs a print process based on the HTML data obtained (Japanese Laid-open Patent Publication No. 2012-079213).

The standard of "HTML5" has recently been proposed and has come into use. According to the HTML5 standard, an animation and a video game are implemented without the use of Flash.

In the meantime, according to Flash, a web browser is capable of detecting completion of download of data through a Flash Application Program Interface (API). Thus, it is possible to execute promptly predetermined processing which is to be performed immediately after downloading certain data.

However, without the use of Flash, such predetermined processing cannot be executed promptly, which sometimes causes troubles.

SUMMARY

The present invention has been achieved in light of such an issue, and an object thereof is to provide a technology with which completion of data transmission from a web server is detected more easily than with conventionally possible, even if Flash is not used.

A web system according to an aspect of the present invention is a web system including a web client configured to have a web browser, and a web server configured to provide the web client with a computer program to be executed on the web browser. The web server includes a delivery portion configured to deliver, as the computer program, a predetermined processing program to the web client, the predetermined processing program causing the web client, when the web client starts receiving specific data from the web server, to execute inquiry processing of inquiring of the web server as to a state of transmission of the specific data in the web server, and the predetermined processing program causing the web client to execute predetermined processing after a reply that the transmission is completed is received as the state; and a reply portion configured to, when an inquiry as to the state is sent from the web client, inform the web client of the state.

These and other characteristics and objects of the present invention will become more apparent by the following descriptions of preferred embodiments with reference to drawings.

BRIEF DESCRIPTION OF THE DRAWINGS

FIG. 5 is a diagram showing an example of a top page.

DESCRIPTION OF THE PREFERRED EMBODIMENTS

Figure 1:
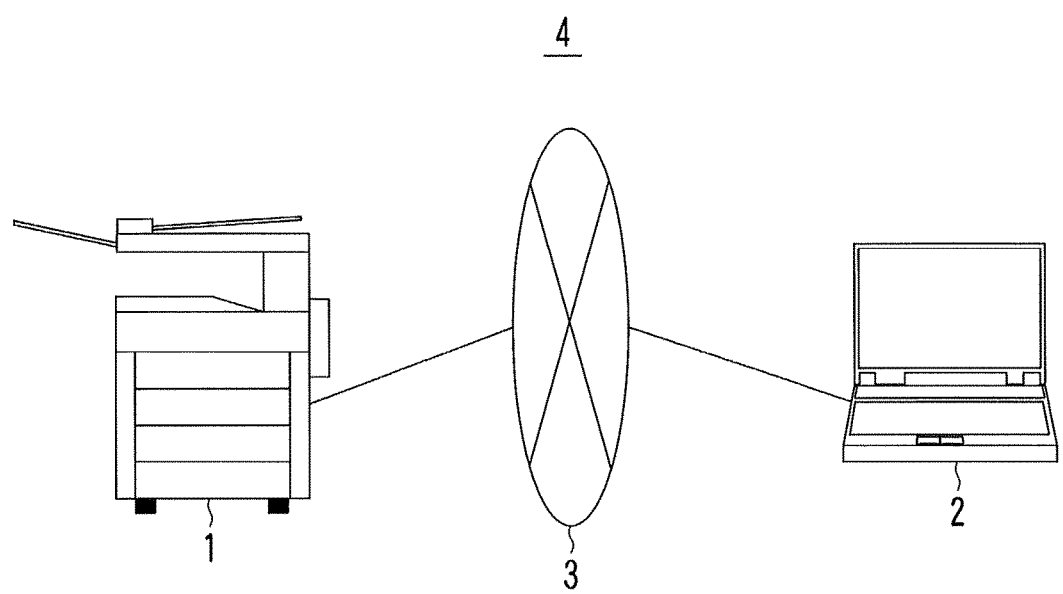
FIG. 1 is a diagram showing an example of the overall configuration of a network system.
Figure 2:
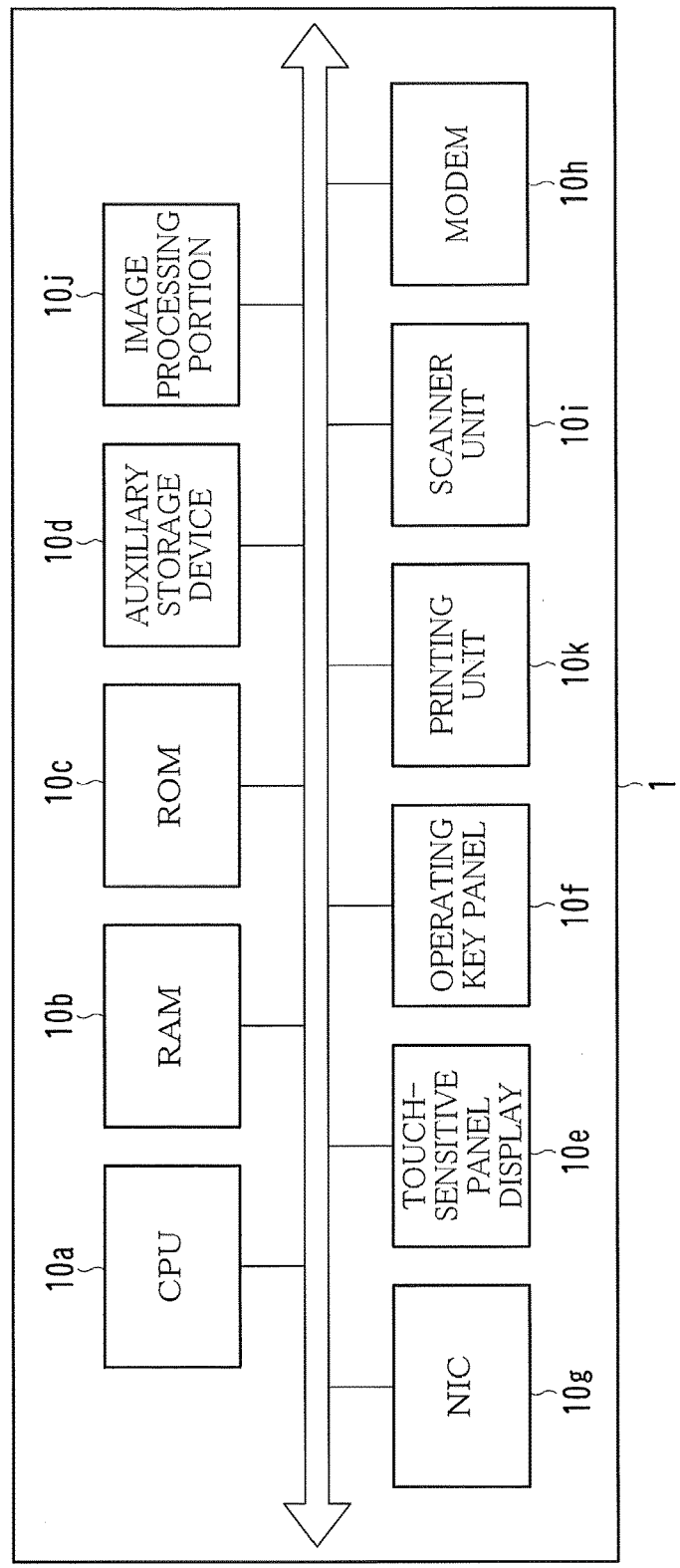
FIG. 2 is a diagram showing an example of the hardware configuration of an image forming apparatus.
Figure 3:
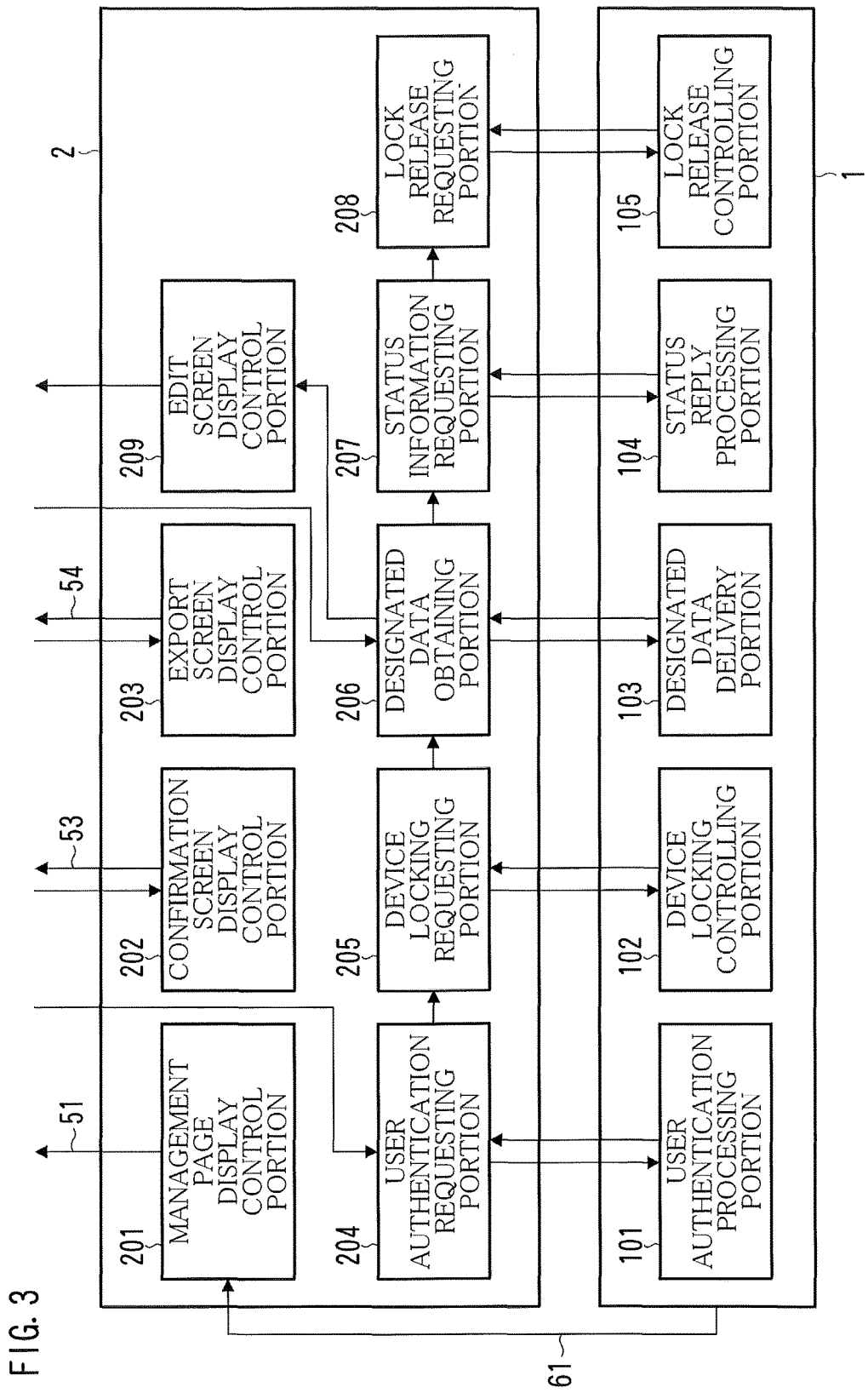
FIG. 3 is a diagram showing an example of the functional configuration of an image forming apparatus and a terminal.

FIG. 1 is a diagram showing an example of the overall configuration of a network system 4. FIG. 2 is a diagram showing an example of the hardware configuration of an image forming apparatus 1. FIG. 3 is a diagram showing an example of the functional configuration of the image forming apparatus 1 and a terminal 2.

As shown in FIG. 1, the network system 4 is configured of the image forming apparatus 1, the terminal 2, a communication line 3, and so on. The image forming apparatus 1 and the terminal 2 are configured to perform communication with each other via the communication line 3. Examples of the communication line 3 are the Internet, a public line, and a Local Area Network (LAN) line.

The image forming apparatus 1 is an image processing apparatus that is generally called a "multifunction device" or a "Multi-Functional Peripheral (MFP)". The image forming apparatus 1 is a device into which functions such as copying, PC printing, faxing, scanning, and box function and web server function are combined.

The PC printing function is to print an image onto paper based on image data sent from the terminal 2.

The box function is a function in which a storage area called a "box" or "personal box" is allocated to each user.

The box function enables each user to save image data or the like to his/her storage area and to manage the image data therein. The box function also enables each group to be given a box which is to be shared by members of the group. The box corresponds to a "folder" or "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage device 10d, a touch-sensitive panel display 10e, an operating key panel 10f, a Network Interface Card (NIC) 10g, a modem 10h, a scanner unit 10i, an image processing portion 10j, a printing unit 10k, and so on.

The touch-sensitive panel display 10e displays, for example, a screen for presenting messages to a user, a screen for allowing a user to input commands or information, a screen for showing the results of processing executed by the CPU 10a and so on. The touch-sensitive panel display 10e sends a signal indicating a touched location to the CPU 10a.

The operating key panel 10f is a so-called hardware keyboard, and is provided with a numeric keypad, a start key, a stop key, and a function key.

The NIC 10g performs communication with other devices in accordance with a protocol such as Transmission Control Protocol/Internet Protocol (TCP/IP) or a higher protocol. Examples of the higher protocol are Hypertext Transfer Protocol (HTTP), HTTP over transport layer Security (HTTPS), eXtensible Messaging and Presence Protocol (XMPP), and Simple Network Management Protocol (SNMP).

The modem 10h sends and receives image data with a facsimile terminal in accordance with a protocol such as G3.

The scanner unit 10i optically reads an image recorded on a sheet of paper placed on a platen glass, and generates image data thereof.

The image processing portion 10j performs processing such as resolution conversion or upside down correction on the image data obtained by the NIC 10g, the modem 10h, or the scanner unit 10i.

After the image processing portion 10j appropriately applies processing to the image captured by the scanner unit 10i or an image sent by another device, the printing unit 10k prints the post-processing image onto paper.

The ROM 10c or the auxiliary storage device 10d stores, therein, software for implementing the foregoing functions such as the copy function.

Programs or modules configuring the software are loaded into the RAM 10b as necessary, and are executed by the CPU 10a. Examples of the auxiliary storage device 10d are a hard disk drive and a Solid State Drive (SSD).

The ROM 10c or the auxiliary storage device 10d also stores, therein, a program which allows a user to check the status of the image forming apparatus 1 and to make settings for the image forming apparatus 1 through the terminal 2 from a remote location.

The program implements the functions of a user authentication processing portion 101, a device locking controlling portion 102, a designated data delivery portion 103, a status reply processing portion 104, a lock release controlling portion 105, and so on, all of which are shown in FIG. 3. The program is executed on a web server.

The terminal 2 is a client through which the user uses a variety of services provided by the image forming apparatus 1. The terminal 2 has installed therein a driver for controlling the image forming apparatus 1 and a web browser.

The web browser is configured to perform an operation or to display a web page on the display based on data described in a markup language such as an Extensible Markup Language (XML) or a Hypertext Markup Language (HTML), or, alternatively, described in a procedural language such as JavaScript (registered trademark). The data described in such a language is hereinafter referred to as "page code data".

In this embodiment, the web browser displays, particularly, a web page (management page 51 shown in FIG. 6) for managing an image to be printed onto paper together with a document image by the image forming apparatus 1 based on page code data 61. Such an image to be printed together with the document image is hereinafter referred to as an "additional image". Examples of the additional image are watermarks such as "confidential" or "DRAFT", copy protect such as "COPY", company logo, logo for product, and various stamps.

The page code data 61 implements, in the terminal 2, the functions of a management page display control portion 201, a confirmation screen display control portion 202, an export screen display control portion 203, a user authentication requesting portion 204, a device locking requesting portion 205, a designated data obtaining portion 206, a status information requesting portion 207, a lock release requesting portion 208, an edit screen display control portion 209, and so on, all of which are shown in FIG. 3.

The terminal 2 may be a personal computer, a tablet computer, or a smartphone.

Figure 4A:
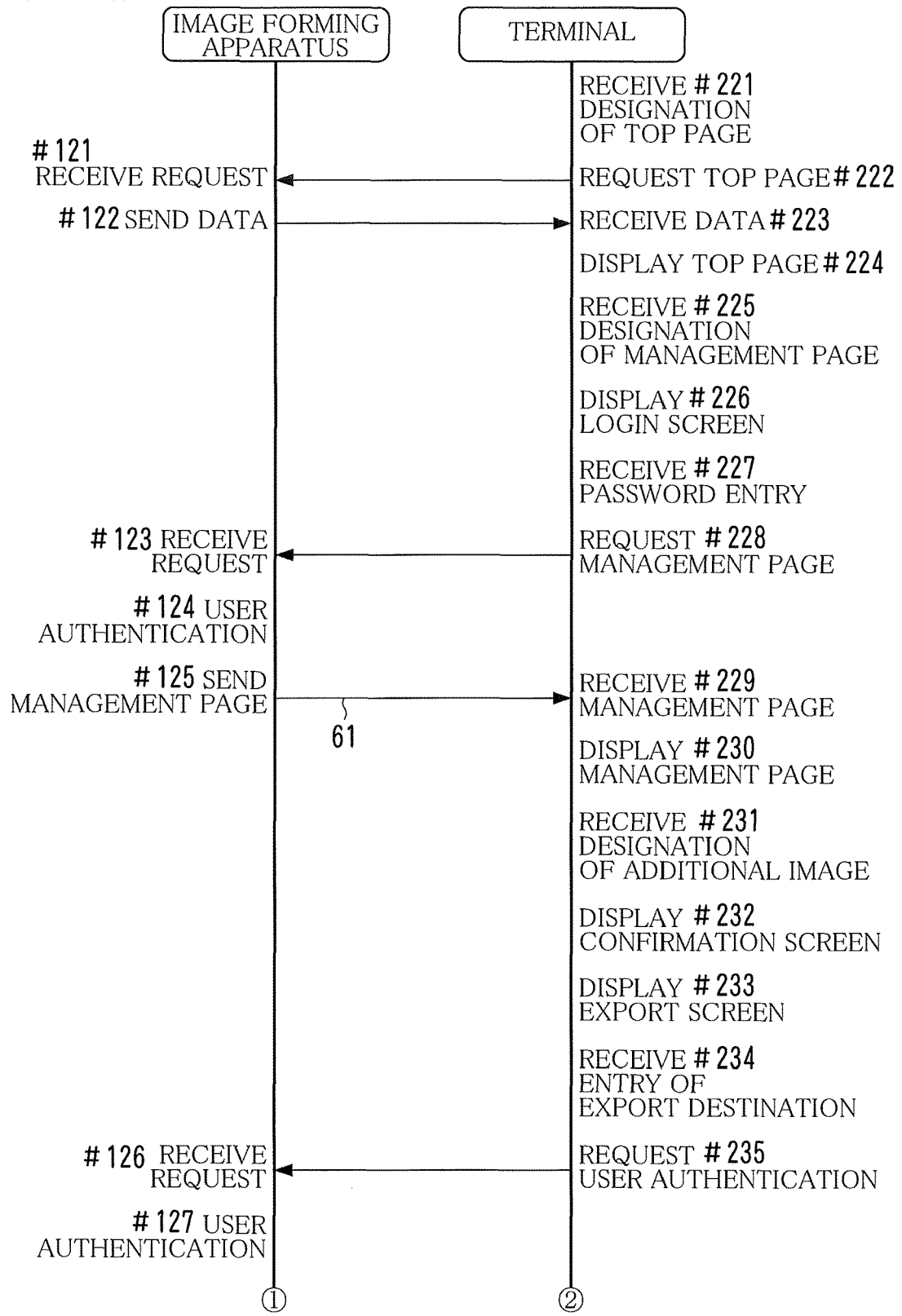
FIGS. 4A and 4B are sequence diagrams showing an example of the flow of the processing by an image forming apparatus and a terminal.
Figure 4B:
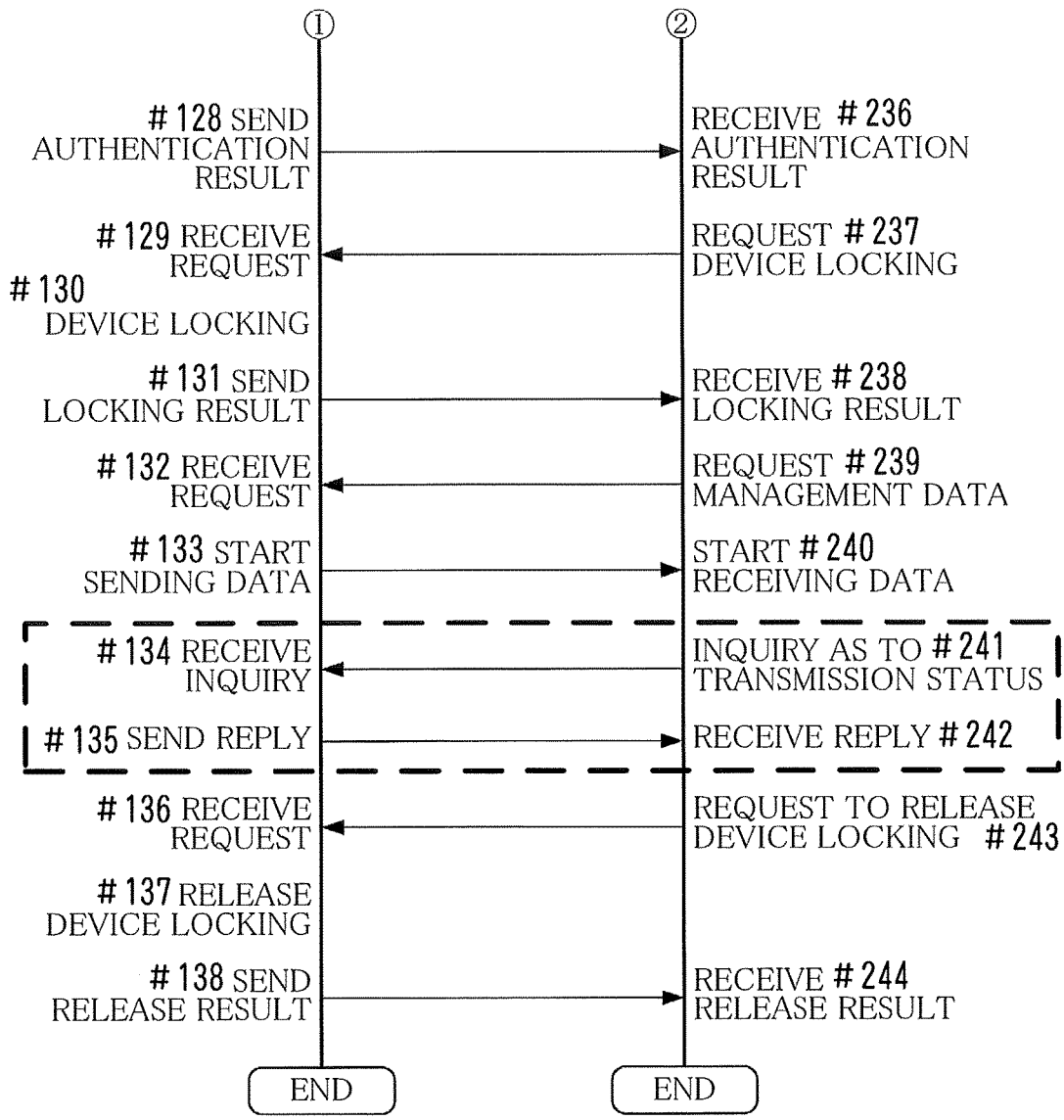
Figure 6:
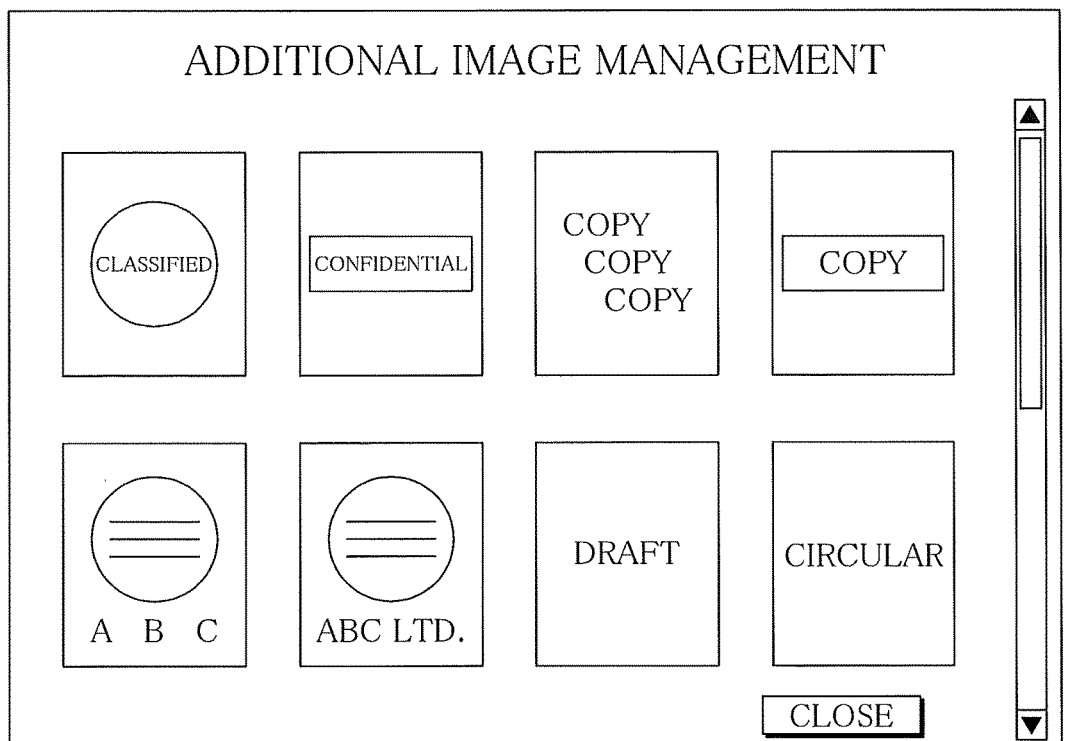
FIG. 6 is a diagram showing an example of a management page.
Figure 7:
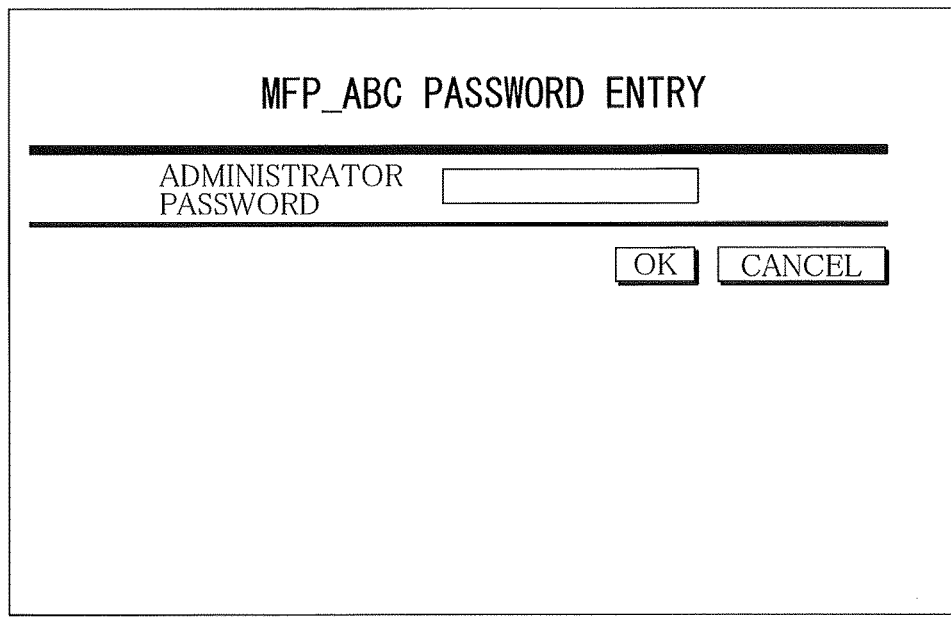
FIG. 7 is a diagram showing an example of a login screen.
Figure 8:
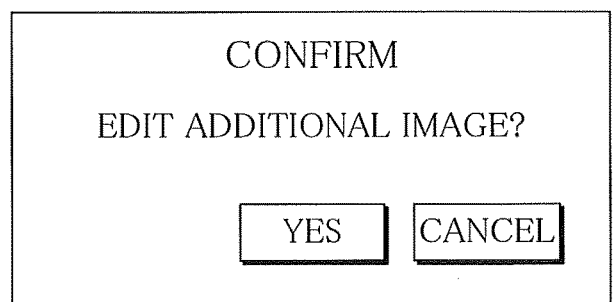
FIG. 8 is a diagram showing an example of a confirmation screen.
Figure 9:
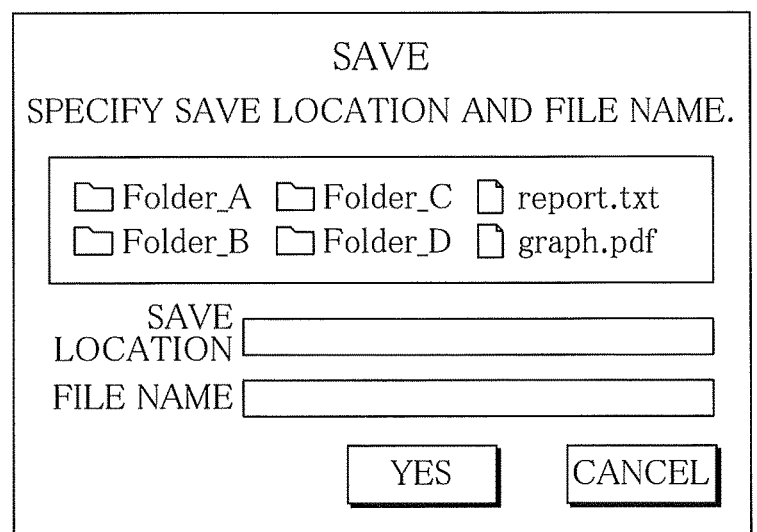
FIG. 9 is a diagram showing an example of an export screen.

FIGS. 4A and 4B are sequence diagrams showing an example of the flow of the processing by the image forming apparatus 1 and the terminal 2. FIG. 5 is a diagram showing an example of a top page 50. FIG. 6 is a diagram showing an example of the management page 51. FIG. 7 is a diagram showing an example of a login screen 52. FIG. 8 is a diagram showing an example of a confirmation screen 53. FIG. 9 is a diagram showing an example of an export screen 54.

The description goes on to the processing by the individual portions of the image forming apparatus 1 and the terminal 2 shown in FIG. 3, and operation by the user with reference to the sequence diagrams of FIGS. 4A, 4B, and so on.

The web browser of the terminal 2 requests data for displaying a web page, e.g., page code data and image data, from the image forming apparatus 1 based on a Uniform Resource Locator (URL) designated by the user, and downloads the data.

In response to the request, the web server of the image forming apparatus 1 sends the data for displaying a web page to the terminal 2.

Particularly, in this embodiment, the web server of the image forming apparatus 1 sends data for displaying the top page 50 which is the top web page of the image forming apparatus 1 as shown in FIG. 5, and data for displaying the management page 51 shown in FIG. 6 in response to the request from the web browser of the terminal 2.

The user enters a Uniform Resource Locator (URL) of the top page 50 into the web browser of the terminal 2, so that the top page 50 is designated.

When receiving the designation (Step #221 of FIG. 4A), the web browser of the terminal 2 requests the data for the top page 50 from the image forming apparatus 1 (Step #222).

In response to the request (Step #121), the web server of the image forming apparatus 1 sends the data for the top page 50 to the terminal 2 (Step #122).

When receiving the data for the top page 50 (Step #223), the web browser of the terminal 2 displays the top page 50 on the display (Step #224).

The user checks radio buttons for "administrator" and for "additional image management" in the top page 50. Thereby, an administrator account and the management page 51 are designated as a login account and a web page to be accessed, respectively.

Only the administrator is allowed to have access to the management page 51. When receiving the designation by the user (Step #225), the web browser of the terminal 2 displays the login screen 52 as shown in FIG. 7 to prompt the user to enter an administrator password (Step #226). When the user enters the password, the web browser of the terminal 2 receives the password (Step #227). The web browser of the terminal 2 requests data for the management page 51 from the image forming apparatus 1, and informs the image forming apparatus 1 of the password received (Step #228).

Upon the receipt of the request (Step #123), the web server of the image forming apparatus 1 performs user authentication based on the password received together with the request (Step #124). Stated differently, the web server checks whether or not the user of the terminal 2 is an authorized user (administrator). When determining that the user of the terminal 2 is an authorized user, the web server of the image forming apparatus 1 sends, as the data for the management page 51, the page code data 61 and the image data to the terminal 2 (Step #125). Thereby, the user logs onto the image forming apparatus 1 as the administrator, and a session is acquired between the image forming apparatus 1 and the terminal 2.

The web browser of the terminal 2 receives the page code data 61, and so on (Step #229). After that, based on the page code data 61, the management page display control portion 201 through the edit screen display control portion 209 shown in FIG. 3 perform processing. With the image forming apparatus 1, the user authentication processing portion 101 through the lock release controlling portion 105 perform processing.

The management page display control portion 201 displays the management page 51 of FIG. 6 (Step #230). The management page 51 has a list of thumbnails of additional images. The user designates an additional image to be edited by clicking onto the thumbnail for the additional image.

When the additional image is designated, the confirmation screen display control portion 202, the export screen display control portion 203, the user authentication requesting portion 204, the device locking requesting portion 205, and the designated data obtaining portion 206 perform processing as discussed below.

When receiving the designation of the additional image (Step #231), the confirmation screen display control portion 202 displays the confirmation screen 53 as shown in FIG. 8 above the management page 51 (Step #232). The confirmation screen 53 is a dialog for the user to check whether or not image data on the additional image is downloaded (exported from the image forming apparatus 1 to the terminal 2) to edit the additional image.

When the user clicks onto a "YES" button, the export screen display control portion 203 closes the confirmation screen 53 to display the export screen 54 as that shown in FIG. 9 above the management page 51 (Step #233). The export screen 54 is a dialog for the user to designate a location to save the downloaded image data on the additional image (save location or export destination) and a data name (file name). The user makes a designation thereof on the export screen 54.

When receiving the designation of the save location, and so on (Step #234), the user authentication requesting portion 204 sends the password received in Step #227 to the image forming apparatus 1, thereby to request the image forming apparatus 1 to perform again user authentication (Step #235).

With the image forming apparatus 1, when receiving the request (Step #126), the user authentication processing portion 101 performs user authentication based on the password sent together with the request (Step #127). When determining that the user is an authorized user (administrator), the user authentication processing portion 101 informs the terminal 2 to that effect (Step #128 of FIG. 4B). This allows the user to again log onto the image forming apparatus 1.

With the terminal 2, when being informed that the user is an authorized user (Step #236), the device locking requesting portion 205 requests the image forming apparatus 1 to deny access from devices other than the terminal 2 (Step #237).

With the image forming apparatus 1, when receiving the request (Step #129), the device locking controlling portion 102 modifies various settings (Step #130) so that access from devices other than the request source (namely, the terminal 2) is denied. In short, the device locking controlling portion 102 implements device locking. After the completion of the device locking, the image forming apparatus 1 notifies the terminal 2 that the device locking is completely implemented (Step #131).

With the terminal 2, when being notified that the device locking is completely implemented (Step #238), the designated data obtaining portion 206 obtains, from the image forming apparatus 1, the image data on the additional image related to the designation received in Step #231, in the following manner. The designated data obtaining portion 206 requests the image data on the additional image from the image forming apparatus 1 (Step #239).

With the image forming apparatus 1, the designated data delivery portion 103 receives the request (Step #132), and starts sending (delivering), to the terminal 2, the image data on the additional image related to the request (Step #133). The designated data obtaining portion 206 starts receiving the image data (Step #240).

While the image data is sent from the image forming apparatus 1 to the terminal 2, the status information requesting portion 207 inquires the image forming apparatus 1 as to a status of the image data transmission at regular intervals (for example, every two seconds) (Step #241). In response to the inquiry, the status reply processing portion 104 makes a reply to the terminal 2 that the image data is currently sent or that the image data is completely sent (Step #134).

When receiving a reply that the image data is completely sent (Step #242), the lock release requesting portion 208 requests the image forming apparatus 1 to release the device locking (Step #243). The image data is saved to the save location related to the designation received in Step #234.

In response to the request (Step #136), the lock release controlling portion 105 cancels the access limitation executed in Step #130 (Step #137). In short, the lock release controlling portion 105 releases the device locking in the image forming apparatus 1. The lock release controlling portion 105 notifies the terminal 2 that the device locking is completely released (Step #138), and the terminal 2 receives the notification (Step #244).

Thereafter, the edit screen display control portion 209 displays, based on the image data saved, a screen used to edit the additional image. The user edits the additional image through the screen. The user then uploads image data on the post-edit additional image to the image forming apparatus 1. In uploading the image data, the device locking in the image forming apparatus 1 may be implemented.

After the image data is completely sent from the image forming apparatus 1 to the terminal 2, the user may be logged out of the image forming apparatus 1 once so that the session between the image forming apparatus 1 and the terminal 2 is finished.

The Cookie technology may be used to make a response from the image forming apparatus 1 to the terminal 2. Examples of the response are a notice of authentication result, a notice of completion of device locking, a notice of transmission status, and a notice of device locking release.

Figure 10:
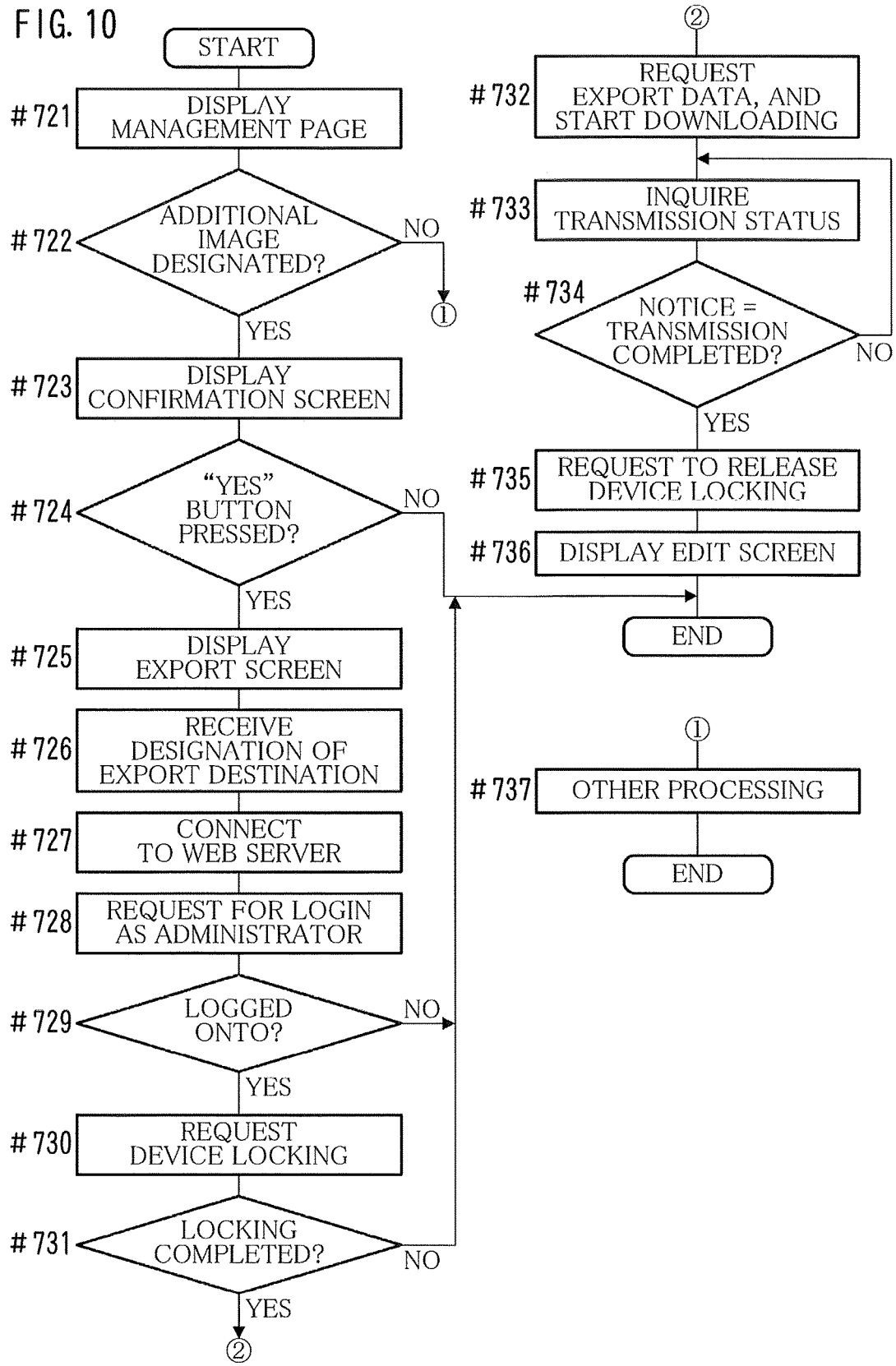
FIG. 10 is a flowchart depicting an example of the flow of the entire processing by a terminal based on page code data.
Figure 11:
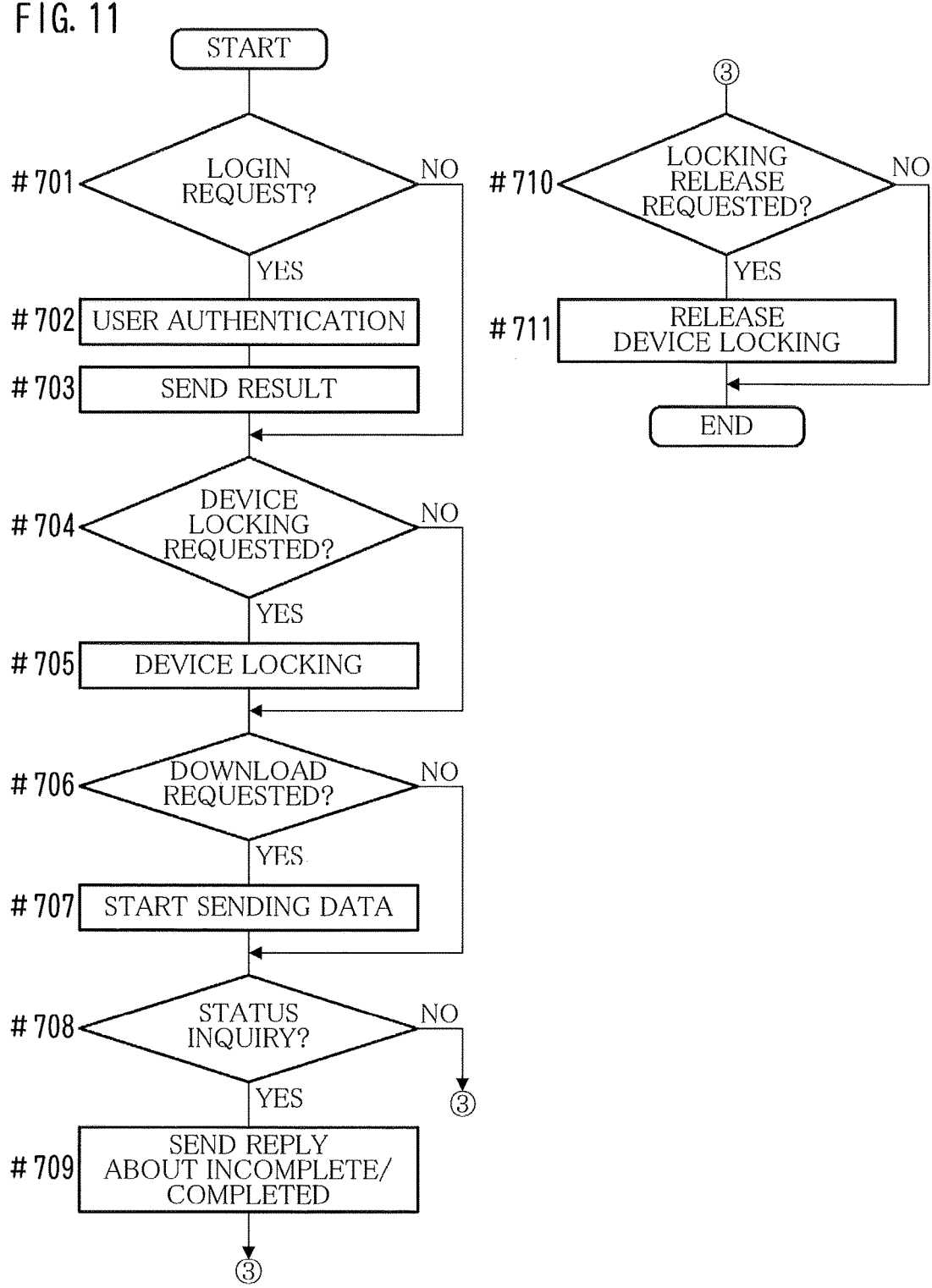
FIG. 11 is a flowchart depicting an example of the flow of the entire processing by an image forming apparatus for the case where a management page is displayed in a terminal.

FIG. 10 is a flowchart depicting an example of the flow of the entire processing by the terminal 2 based on the page code data 61. FIG. 11 is a flowchart depicting an example of the flow of the entire processing by the image forming apparatus 1 for the case where the management page 51 is displayed in the terminal 2.

The description goes on to the flow of the entire processing by the image forming apparatus 1 and the terminal 2 for the case where image data on an additional image is sent/received therebetween. The description is provided below with reference to the flowcharts of FIGS. 10 and 11.

When receiving the page code data 61 from the image forming apparatus 1, the terminal 2 performs processing based on the page code data 61 according to the procedure shown in FIG. 10.

Upon the receipt of the page code data 61, the terminal 2 displays the management page 51 (see FIG. 6) (Step #721 of FIG. 10).

When the user designates an additional image (YES in Step #722), the terminal 2 displays the confirmation screen 53 (Step #723). In response to a button "YES" clicked by the user (YES in Step #724), the terminal 2 displays the export screen 54 (Step #725). The terminal 2 receives (Step #726) a save location and a data name, which have been designated in the export screen 54 by the user, of the image data on the additional image. The terminal 2 establishes a connection with the image forming apparatus 1 (Step #727).

After the connection with the image forming apparatus 1 is established, the terminal 2 sends the password entered in advance by the user to the image forming apparatus 1. Thereby, the terminal 2 requests the image forming apparatus 1 to again perform user authentication so as to allow the user to log onto the image forming apparatus 1 as an administrator (Step #728).

When the user successfully logs onto the image forming apparatus 1 (YES in Step #729), the terminal 2 makes a request for device locking in the image forming apparatus 1 (Step #730). Upon the completion of the device locking (Step #731), the terminal 2 requests the image data on the additional image from the image forming apparatus 1 and starts downloading the image data therefrom (Step #732).

After starting downloading the image data, the terminal 2 inquires of the image forming apparatus 1 as to a transmission status at regular intervals (Step #733). When receiving a reply that the transmission is completed (YES in Step #734), the terminal 2 makes a request to release the device locking in the image forming apparatus 1 (Step #735). The terminal 2 displays, based on the image data, a screen used to edit the additional image (Step #736).

On the other hand, every time a request is made by the terminal 2, the image forming apparatus 1 performs processing as shown in FIG. 11.

When receiving a request for user authentication (login) from the terminal 2 (YES in Step #701 of FIG. 11), the image forming apparatus 1 performs user authentication based on a password sent together with the request (Step #702), and sends the result of user authentication to the terminal 2 (Step #703).

When receiving a request for device locking (YES in Step #704), the image forming apparatus 1 makes settings in such a manner that access from devices other than the request source terminal 2 is denied (Step #705). In short, the image forming apparatus 1 implements device locking.

Under the device locking, the image forming apparatus 1 accepts no operation through the touch-sensitive panel display 10*e* and the operating key panel 10*f*.

When receiving a request for image data (YES in Step #706), the image forming apparatus 1 starts sending the image data (Step #707).

When receiving an inquiry as to a transmission status of the image data (YES in Step #708), the image forming apparatus 1 sends a reply about the status ("currently transmitted" or "transmission completed") to the terminal 2 (Step #709).

When receiving a request for release from the device locking (YES in Step #710), the image forming apparatus 1 releases the device locking (Step #711).

According to this embodiment, without the use of Flash technology, the web browser of the terminal 2 is capable of detecting the completion of transmission of specific data from the image forming apparatus 1. This makes it possible to execute, without delay, processing to be executed after the specific data is received. In particular, access limitation to the image forming apparatus 1 from devices other than the terminal 2 may be cleared immediately by executing, without delay, processing of requesting device locking release. This facilitates the use of the image forming apparatus 1.

Therefore, the technology according to this embodiment is used effectively in a device where no Flash is needed, such as an HTML5.

In this embodiment, the image forming apparatus 1 sends, as the specific data, image data for management.

Instead of this, however, other data may be sent as the specific data. For example, settings data for the image forming apparatus 1 may be sent as the specific data. A log of the image forming apparatus 1 may be sent as the specific data. Back-up data of the image forming apparatus 1 may be sent as the specific data.

This embodiment is described by taking an example in which the image forming apparatus 1 is used as a device having a web server function. Instead of this however, the present invention is applicable to another device. The present invention is also applicable to, for example, a device specifically for scanning, a device specifically for faxing, a device specifically for printing, a Network Attached Storage (NAS), a router, and the like.

In this embodiment, the terminal 2 executes, as predetermined processing after image data is completely sent, processing of requesting device locking release. Instead of this, however, the terminal 2 may execute other processing. For example, the terminal 2 may perform processing of editing image data.

As discussed above, according to this embodiment, even when Flash is not used, a web client is capable of detecting completion of data transmission from a web server more easily than with conventionally possible.

It is to be understood that the configurations of the network system 4, the image forming apparatus 1, the terminal 2, the constituent elements thereof, the content and order of the processing, the configuration of the screens, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A web system comprising:
a web client configured to have a web browser configured to display data described in a markup language; and
an image forming apparatus comprising a web server and a printer, the web server being configured to provide the web client with a computer program to be executed on the web browser, the computer program being in the markup language; wherein
the web server includes
a delivery portion configured to deliver, as the computer program, a predetermined processing program to the web client, the predetermined processing program causing the web client, when the web client starts receiving specific data from the web server, to execute inquiry processing of inquiring of the web server as to a state of transmission of the specific data in the web server, and the predetermined processing program causing the web client to execute predetermined processing after a reply that the transmission is completed is received as the state, and
a reply portion configured to, when an inquiry as to the state is sent from the web client, inform the web client of the state,
wherein the image forming apparatus enters a locking state before beginning to transmit the specific data to the web client, the web server of the image forming apparatus denying access to other web clients while the image forming apparatus is in the locking state except for the web client,
wherein the specific data sent by the web server to the web client sent in the markup language includes both image data regarding a document stored in the image forming apparatus and additional image data selected by a user of the web client before the image forming apparatus enters the locking state,
wherein the web server performs a first user authentication before the additional image data is selected by the user of the web client to allow the user of the web client to select the additional image data, and
wherein the web server performs a second user authentication after the additional image data is selected by the user of the web client, the second user authentication causing the image forming apparatus to enter the locking state.

2. The web system according to claim 1, wherein the delivery portion delivers, as the predetermined processing program, a computer program for causing the web client to execute the inquiry processing at regular intervals until the reply that the transmission is completed is received.

3. The web system according to claim 1, wherein the delivery portion delivers, as the predetermined processing program, a computer program for causing the web client to execute:
processing of requesting the web server to implement device locking in the web server;
processing of requesting the specific data from the web server; and
as the predetermined processing, processing of requesting the web server to release the device locking.

4. An image forming apparatus comprising:
a printer; and
a web server for providing a web client having a web browser configured to display data described in a markup language with a computer program to be executed on the web browser, the computer program being in the markup language, the web server comprising:
a delivery portion configured to deliver, as the computer program, a predetermined processing program to the web client, the predetermined processing program causing the web client, when the web client starts receiving specific data from the web server, to execute inquiry processing of inquiring of the web server as to a state of transmission of the specific data in the web server, and the predetermined processing program causing the web client to execute predetermined processing after a reply that the transmission is completed is received as the state; and
a reply portion configured to, when an inquiry as to the state is sent from the web client, inform the web client of the state,
wherein the image forming apparatus enters a locking state before beginning to transmit the specific data to the web client, the web server of the image forming apparatus denying access to other web clients while the image forming apparatus is in the locking state except for the web client, and
wherein the specific data sent by the web server to the web client sent in the markup language includes both image data regarding a document stored in the image forming apparatus and additional image data selected by a user of the web client before the image forming apparatus enters the locking state,
wherein the web server performs a first user authentication before the additional image data is selected by the user of the web client to allow the user of the web client to select the additional image data, and
wherein the web server performs a second user authentication after the additional image data is selected by the user of the web client, the second user authentication causing the image forming apparatus to enter the locking state.

5. The image forming apparatus according to claim 4, wherein the delivery portion delivers, as the predetermined processing program, a computer program for causing the web client to execute the inquiry processing at regular intervals until the reply that the transmission is completed is received.

6. The image forming apparatus according to claim 4, wherein the delivery portion delivers, as the predetermined processing program, a computer program for causing the web client to execute:
processing of requesting the web server to implement device locking in the web server;
processing of requesting the specific data from the web server; and
as the predetermined processing, processing of requesting the web server to release the device locking.

7. A method for delivering data by a web server of an image forming apparatus, the web server providing a web client having a web browser configured to display data described in a markup language with a computer program to be executed on the web browser, the computer program being in the markup language, the image forming apparatus further comprising a printer, the method comprising:

delivering, as the computer program, a predetermined processing program from the web server of the image forming apparatus to the web client, the predetermined processing program causing the web client, when the web client starts receiving specific data from the web server, to execute inquiry processing of inquiring of the web server as to a state of transmission of the specific data in the web server, and the predetermined processing program causing the web client to execute predetermined processing after a reply that the transmission is completed is received as the state; and when an inquiry as to the state is sent from the web client, informing, by the web server, the web client of the state, wherein the image forming apparatus enters a locking state before beginning to transmit the specific data to the web client, the web server of the image forming apparatus denying access to other web clients while the image forming apparatus is in the locking state except for the web client, wherein the specific data sent by the web server to the web client sent in the markup language includes both image data regarding a document stored in the image forming apparatus and additional image data selected by a user of the web client before the image forming apparatus enters the locking state, wherein the web server performs a first user authentication before the additional image data is selected by the user of the web client to allow the user of the web client to select the additional image data, and wherein the web server performs a second user authentication after the additional image data is selected by the user of the web client, the second user authentication causing the image forming apparatus to enter the locking state.

8. The method according to claim 7, wherein the web server delivers, as the predetermined processing program, a computer program for causing the web client to execute the inquiry processing at regular intervals until the reply that the transmission is completed is received.

9. The method according to claim 7, wherein the web server delivers, as the predetermined processing program, a computer program for causing the web client to execute:

processing of requesting the web server to implement device locking in the web server;

processing of requesting the specific data from the web server; and as the predetermined processing, processing of requesting the web server to release the device locking.

10. A non-transitory computer-readable storage medium storing thereon a computer program to be executed on a web browser configured to display data described in a markup language installed onto a computer, the computer program being provided to the computer from an image forming apparatus comprising a web server and a printer, the computer program being in the markup language, the computer program causing the computer to execute processing comprising:

inquiry processing of, when the computer starts receiving specific data from the web server, inquiring of the web server as to a state of transmission of the specific data in the web server; and predetermined processing after a reply that the transmission is completed is received as the state, wherein the image forming apparatus enters a locking state before beginning to transmit the specific data to the computer, the web server of the image forming apparatus denying access to other computers while the image forming apparatus is in the locking state except for the computer, wherein the specific data sent by the web server to the web client sent in the markup language includes both image data regarding a document stored in the image forming apparatus and additional image data selected by a user of the web client before the image forming apparatus enters the locking state, wherein the web server performs a first user authentication before the additional image data is selected by the user of the web client to allow the user of the web client to select the additional image data, and wherein the web server performs a second user authentication after the additional image data is selected by the user of the web client, the second user authentication causing the image forming apparatus to enter the locking state.

11. The non-transitory computer-readable storage medium according to claim 10, wherein the inquiry processing is executed at regular intervals until the reply that the transmission is completed is received.

12. The non-transitory computer-readable storage medium according to claim 10, wherein the computer program causes the computer to execute:

processing of requesting the web server to implement device locking in the web server;

processing of requesting the specific data from the web server; and as the predetermined processing, processing of requesting the web server to release the device locking.

13. The web system according to claim 1, wherein the web client is configured to display an edit screen allowing a user to edit the document image data and the additional image data after the transmission of the specific data is complete and the locking state has ended.

14. The web system according to claim 1, wherein the first user authentication is performed after the user of the web client selects a first button to log-in as an administrator and selects a second button to perform image management on the image data.

15. The image forming apparatus according to claim 4, wherein the first user authentication is performed after the user of the web client selects a first button to log-in as an administrator and selects a second button to perform image management on the image data.

16. The method according to claim 7, wherein the first user authentication is performed after the user of the web client selects a first button to log-in as an administrator and selects a second button to perform image management on the image data.

17. The non-transitory computer-readable storage medium according to claim 10, wherein the first user authentication is performed after the user of the web client selects a first button to log-in as an administrator and selects a second button to perform image management on the image data.

* * * * *